United States Patent [19]

Horacek

[11] Patent Number: 4,522,968

[45] Date of Patent: Jun. 11, 1985

[54] PROCESS FOR THE PREPARATION OF WATER-IN-WATER SECONDARY DISPERSIONS OF WATER-SOLUBLE POLYMERS AND THEIR UTILIZATION AS FLOCCULANTS

[75] Inventor: Heinrich Horacek, Frankenthal, Fed. Rep. of Germany

[73] Assignee: BASF Aktiengesellschaft, Ludwigshafen, Fed. Rep. of Germany

[21] Appl. No.: 611,106

[22] Filed: May 17, 1984

[30] Foreign Application Priority Data

May 19, 1983 [DE] Fed. Rep. of Germany ....... 3318218

[51] Int. Cl.$^3$ ...................... C08L 33/00; C08L 33/26; C08K 5/10
[52] U.S. Cl. .................................... 524/388; 524/555; 524/556; 524/560
[58] Field of Search ................ 524/388, 555, 556, 560

[56] References Cited

U.S. PATENT DOCUMENTS

| | | | |
|---|---|---|---|
| 2,982,749 | 5/1961 | Friedrich et al. | 524/922 |
| 3,284,393 | 11/1966 | Vanderhoff et al. | 526/287 |
| 3,402,137 | 9/1968 | Fischer et al. | 524/321 |
| 3,624,019 | 11/1971 | Anderson et al. | 524/922 |
| 3,657,182 | 4/1972 | Jolly | 524/156 |
| 4,010,135 | 3/1977 | Tutein | 524/388 |
| 4,380,600 | 4/1983 | Hosoda et al. | 524/460 |
| 4,419,483 | 12/1983 | Yanutola | 524/555 |
| 4,454,260 | 6/1984 | Dawans et al. | 524/388 |

FOREIGN PATENT DOCUMENTS 1397933 6/1975 United Kingdom .

*Primary Examiner*—Ronald W. Griffin
*Attorney, Agent, or Firm*—Bernhard R. Swick

[57] ABSTRACT

Process for the preparation of water-in-water secondary dispersions of homo- or copolymers of (meth)acryl compounds through the dispersion of fine particle polymers of the type cited in an aqueous solution which contains in dissolved form from 2 to 50 weight percent of a polymer of ethylene oxide and/or propylene oxide having a molecular weight of from 500 to 10,000. The secondary dispersions can be easily diluted with water and are used as flocculants.

14 Claims, No Drawings

PROCESS FOR THE PREPARATION OF WATER-IN-WATER SECONDARY DISPERSIONS OF WATER-SOLUBLE POLYMERS AND THEIR UTILIZATION AS FLOCCULANTS

BACKGROUND OF THE INVENTION

1. Field of the Invention

This invention relates to homo- and copolymers of (meth)acrylamide compounds.

2. Description of Current Problems

High molecular weight polymers based on (meth)acrylamides are known flocculants, which are used, for example, in waste water clarification and in the removal of water from sludge and sewage treatment plants or to remove water from coal slurries. The polyacrylamides may be commercially obtained in solid form, in aqueous solution, or as water-in-oil polymer emulsions. Although these polyacrylamides are excellent flocculants, there are problems handling these polymers. For example, standard commercial aqueous solutions of high molecular weight polyacrylamides, which are prepared through the polymerization of acrylamide in an aqueous solution, have a very high viscosity—even at a polymer content of only 5 percent—so that high transport costs relative to the polymer are incurred when such solutions are shipped.

Water-in-oil polymer emulsions of polyacrylamides can be quickly dissolved in water by inverting the water-in-oil emulsion in the presence of wetting agents as taught by German Pat. No. 2 154 081, however, then in addition to the flocculant the hydrocarbon oil from the water-in-oil polymer emulsion goes into the waste water and can no longer be removed therefrom by simple means.

British Pat. No. 1,397,933 teaches the dispersion of finely divided water-soluble polymers, for example, polyacrylamide or polyacrylic acid having a particle diameter less than 0.1 mm in a nonaqueous organic medium such as gasoline or a chlorinated hydrocarbon and further teaches the addition of at least one surfactant and, in some cases, anti-foaming agent to the resulting dispersion. When the dispersion is mixed with water, dilute aqueous polymer solutions result. These contain the organic phase of the original polymer dispersion.

German OS No. 29 24 663 relates to a process for the preparation of an aqueous dispersion through the polymerization of (meth)acrylamides or (meth)acrylic acid in an aqueous solution of a water-soluble polymer such as polyethylene glycol, polyvinyl alcohol, polyethylenimine, polyvinylpyrrolidone or soluble starch. The viscosity of these primary dispersions is relatively high, which leads to problems in using the polymer.

Solid polyacrylamides are slow to dissolve in water, so that relatively long dilution times are required to prepare dilute aqueous solutions of high molcular weight polyacrylamides from the solid products. Solid polyacrylamides frequently contain relatively large amounts of very fine particles less than 0.3 mm in size. In order to obtain largely dust-free products, the solid products are screened. However, the finely powdered products cause problems when they are used, because they have a high tendency to generate dust and when the user tries to make dilute aqueous solutions from them, they cause especially serious problems since the fine particle fractions frequently float on the surface of the water and clump together rather than forming a homogeneous solution.

The present invention relates to the desire to be able to provide homo- and copolymers of (meth)acrylamide compounds in a fine particle form, which has a tendency to generate dust, in a form which permits dilute aqueous solutions to be prepared in a simple manner. Another desired feature is to provide preparations of the above-cited water-soluble polymers which can be used as flocculants and which have the lowest possible viscosity.

SUMMARY OF THE INVENTION

The above desired characteristics are achieved by the invention through a process for the preparation of water-in-water secondary dispersions of water-soluble polymers when powdered homo- and copolymers of (meth)acrylamides, (meth)acrylic acids, and (meth)acrylic acid esters of amino alcohols or their salts are dispersed in an aqueous solution which contains from 2 to 50 weight percent of a polymer of ethylene oxide and/or propylene oxide having a molecular weight of from 500 to 10,000 in dissolved form.

DETAILED DESCRIPTION OF THE INVENTION

The homo- and copolymers of (meth)acrylamides, (meth)acrylic acid, or their salts such as (meth)acrylamide acid esters of amino alcohols can be prepared using various methods, for example, the monomers can be polymerized in a dilute aqueous solution, the polymer solution can then be dewatered and the remaining polymer can be subjected to a size reduction process until the required particle size is obtained. Powdered polymers can also be obtained as aqueous dispersions of water-soluble polymers prepared in accordance with the process described in U.S. Pat. No. 3,284,393, in which the dispersed polymer is precipitated with a water-soluble organic solvent in which the polymers are not soluble, for example, acetone or methanol. A further possibility for producing solid polymer in particulate form is offered by the inverse suspension polymerization process as taught by U.S. Pat. No. 2,982,749. After the reaction mixture is azeotropically dewatered, polymer particles suspended in a carbohydrate oil are directly obtained. These particles can then be easily separated from the hydrocarbon oil. The larger sized components can be screened out, while the finely divided polymer, whose particle size is less than 0.3 mm, can be used directly to prepare water-in-water secondary dispersions. Of course it is also possible to grind the screened, coarser fractions and to use the resulting finely broken down material to produce secondary dispersions.

Homopolymers of acrylamide, methacrylamide, acrylic acid, methacrylic acid, or water-soluble salts of the acrylic acid and methacrylic acid can be used, for example, to prepare the secondary dispersions. In addition, one can use copolymers obtained through the copolymerization of acrylamide, methacrylamides, acrylic acid, or methacrylic acid with other ethylenically unsaturated compounds, which also form water-soluble polymers. The homo- and copolymers of (meth)acrylates are obtained by polymerizing at least one monomer of formula:

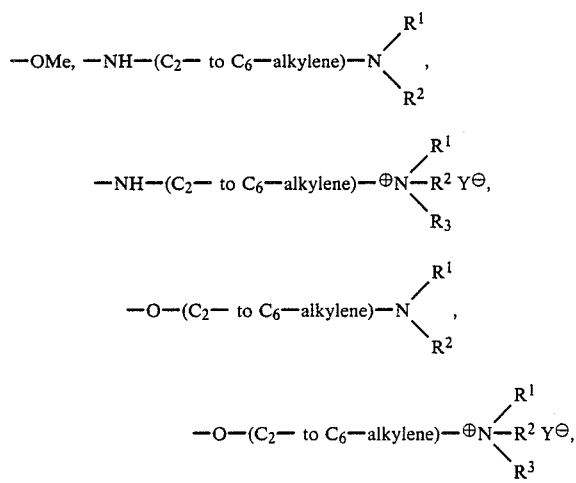

in which
R=—H, —CH₃
X=—NH₂,

R¹, R²=C₁- to C₃-alkyl
R³=H, C₁- to C₃-alkyl
Me=H, Na, K, NH₄ and
Y⁻=Cl⁻, Br⁻, ½SO₄²⁻, CH₃SO₄—, R—COO⁻ in addition to the homopolymers of formula I, in particular copolymers of acrylamide with basic acrylates or methacrylates may be used, for example: dimethylamino ethylacrylate, dimethylamino ethylacrylate, dimethylamino ethylmethacrylate, diethylamino ethylmethacrylate, dimethylamino propylacrylate, dimethylamino propylmethacrylate, dimethylamino neopentylacrylate, dimethylamino neopentylmethacrylate, basic aminoalkyl acrylamides such as dimethylamino ethylacrylamide, dimethylamino ethylmethacrylamide, dimethylamino propylacrylamide, dimethylamino propylmethacrylamide, dimethylamino neopentylacrylamide and dimethylamino neopentylmethacrylamide. The basic acrylates or methacrylates are preferably used in the form of the salts or the quaternized products in the polymerization.

Anionically modified polyacrylamides and polymethacrylamides are of particular importance for use as flocculants. Monomers which may be used for anionic modification are, for example, acrylic acid and methacrylic acid, amidopropanesulfonic acid and vinyl sulfonic acid or their respective water-soluble salts. The anionic or cationic monomer can be present as a component of the acrylamide or methacrylamide copolymer in amounts ranging from 1 to 99 percent.

The polymer particle sizes used for the preparation of the secondary dispersions range from 0.1 μm to 0.3 mm. The polymers are generally used for the preparation of the secondary dispersions in anhydrous form or they contain no more than 10 weight percent water. The molecular weight of the homo- and copolymers of the methacrylates of formula I is at least 1 million. The homo- and copolymers can also be better characterized by the Fikentscher K-value. The K-values for these polymers range between 150 and 300 (measured in 5 percent aqueous NaCl solution at a temperature of 20° C.).

In order to prepare the secondary dispersions of the homo- and copolymers of (meth)acryl compounds, the fine particle polymer is dispersed in an aqueous solution of the polymers of ethylene oxide and/or propylene oxide. Suitable water-soluble polymers for this are, for example, polyethylene glycol, copolymers of ethylene oxide and polypropylene glycol, compounds of this type are prepared, for example, through the addition of ethylene oxide or propylene oxide to hydroxyl-group-containing compounds, preferably to alcohols having from 2 to 6 hydroxyl groups. Thus, polyethylene glycol is obtained, for example, from the addition of ethylene oxide onto water or ethylene glycol (polyether polyol having a functionality of 2, i.e., the polyethylene polyol has 2 hydroxyl groups, while, for example, ethylene oxide adducts on glycerine contain 3 hydroxyl groups and have a functionality of 3). Polymers of ethylene glcyol and propylene glycol are obtained by first adding ethylene oxide and then propylene oxide to alcohols having from 2 to 6 carbon atoms or water or by allowing the alkylene oxides to act on the alcohols in the reverse order. Of course, it is possible to use products produced by allowing a gas mixture of ethylene oxide and propylene oxide to act on water or alcohols. By the same token, block copolymers can be used which are prepared through the addition of ethylene oxide, propylene oxide, and then finally ethylene oxide to compounds having hydroxyl groups. The only imortant thing in producing the secondary dispersions is that the compounds cited are all water-soluble products.

The molecular weight of polyethylene glycol, polypropylene glycol, and the copolymer of ethylene oxide and propylene oxide is from 500 to 10,000, preferably from 1000 to 5000.

The (meth)acrylic polymers are dispersed in the aqueous solutions of the water-soluble polyalkylene oxides cited above. The aqueous solution contains from 2 to 50 weight percent, preferably from 10 to 45 weight percent, of a polyalkylene oxide in dissolved form. The water-in-water secondary suspension contains from 25 to 75 weight percent, preferably from 40 to 60 weight percent, of a polymer of a compound of formula I.

The homo- or copolymers of (meth)acrylamides and (meth)acrylic acid can also be dispersed in the presence of emulsifiers in the aqueous solution of the polyalkylene oxides which are liquid at room temperature. Water-in-oil emulsifiers and oil-in-water emulsifiers can be used, for example, as the emulsifiers. Water-in-oil emulsifiers are, for example, the sorbitan esters of oleic acid, palmitic acid, and stearic acid. The HLB-value of these emulsifiers ranges from 4 to 6 (for the definition of the HLB-value, see W. C. Griffin, J. Soc. Cosmetic Chemists, 1 (1949): 311).

Suitable oil-in-water emulsifiers are, for example, wetting agents such as alkoxylated alkylphenols, alkoxylated amines or alkoxylated higher fatty acids. The HLB-value of the oil-in-water emulsifiers ranges from 8 to 18, preferably from 1 to 5 weight percent of a water-in-oil emulsifier and/or from 1 to 5 weight percent of an oil-in-water emulsifier, each based on the total dispersion, are used to prepare the secondary dispersion.

The water-in-water secondary dispersions of water-soluble polymers of compounds of formula I which can be produced in this manner have a high stability and low viscosity. The high stability of the water-in-water secondary emulsion is based on the fact that both phases of the emulsion contain water as the solvent and that they have similar densities on the order of magnitude of from 1.0 to 1.4 g/cm$^3$. The low viscosity of the secondary dispersions is due to the fact that the higher viscosity phase is present in dispersed form and barely contributes to the viscosity. The water-in-water secondary emulsions possess the desirable characteristic of quickly going into solution when diluted with water. The secondary emulsions are superior to, for example, water-in-oil polymer emulsions of acrylamides from an environmental standpoint, since the water-soluble polyalkylene oxides of the emulsion are biodegradable in contrast to the hydrocarbon oil in the water-in-oil emulsions.

As a result of dilution with water, the secondary water-in-water polymer emulsion has been transformed from a two-phase nonmiscible system to a single phase system with unlimited miscibility.

The water-in-water secondary dispersions of the homo- and copolymers of (meth)acrylamides and (meth)acrylic acid are used as flocculants in community waste water treatment plants for clarifying the waste water and for dewatering the sludge. They are also used in industrial waste treatment plants. Furthermore, these secondary dispersions are suitable for clarifying coal slurries and for processing ore as well as for clarifying the waste water from machines used to produce paper, the so-called "white water."

The parts cited in the examples are parts by weight; the percentages are based on the weight of the substances. The K-values of the polymers were measured in accordance with H. Fikentscher, Cellulose Chemie, 13, (1932): 58–64 and 71–74 in a 5 percent NaCl solution at a temperature of 20° C. Here, $K = k \times 10^3$. The viscosities were determined in a Brookfield Viscosimeter at a temperature of 20° C. (LV-4-Spindle, 30 rpm).

EXAMPLE 1a

Nine parts water, 85 parts of a polyether polyol (prepared through the addition of 25 moles propylene oxide and 75 moles ethylene oxide on 1 mole glycerine, hydroxyl number of the polyether polyol 43, molecular weight 4000), 4 parts sorbitan monooleate, and 2 parts of an octylphenol alkoxylated with 10 moles ethylene oxide were placed in a three-neck flask, which was equipped with a stirrer, and were mixed at a stirrer speed of 600 rpm. Then 100 parts of a solid polymer of 60 percent acrylamide and 40 percent sodium acrylate, which had a particle size less than 0.25 mm, were added slowly. The K-value of the copolymer was 250. After the mixture had been stirred for one hour, a stable water-in-water secondary dispersion having a viscosity of 8000 mPas was obtained.

EXAMPLE 2a

Using the procedure described in Example 1a, 84 parts of a block copolymer of propylene oxide and ethylene oxide in a molar ratio of 90:10 and having a molecular weight of 2000, 14 parts water, and 2 parts of an octylphenol previously alkoxylated with 10 moles ethylene oxide, were mixed together in the flask. Then, 100 parts of a solid copolymer of 60 percent acrylamide and 40 percent sodium acrylate were added. This solid copolymer had a K-value of 250 and a particle size less than 0.25 mm. After the mixture had been stirred for one hour at a speed of 500 rpm, a stable water-in-water secondary dispersion having a viscosity of 4000 mPas was obtained.

EXAMPLES 3a–10a

The procedure described in Example 1a was used; and for every 100 parts of a solid polyacrylate, 84 parts of a water-soluble polymer, as indicated in Table 1, 4 parts water, and 2 parts of an octylphenol previously alkoxylated with 10 moles ethylene oxide, were mixed together in the reactor. The substances used to prepare the secondary dispersions in accordance with Examples 1a–10a are summarized in Table I.

EXAMPLES 1b–10b

Here the same procedure was used as in Examples 1a–10a, except that instead of the anionic copolymer described in those examples, a cationic copolymer of 40 percent acrylamide and 60 percent diethylamino ethylacrylate sulfate (K-value) 200 was used. The results are summarized in Table I, column b.

TABLE I

| Example | Water-Soluble Polyether Polyol | | | Viscosity of Water-in Water Secondary Dispersions at 20° C. (mPas) | |
|---|---|---|---|---|---|
| | Functionality | Molecular Weight | Ratio of Ethylene Oxide to Propylene Oxide | (a) | (b) |
| 1 | 3 | 4000 | 75/25 | 8000 | 6000 |
| 2 | 2 | 2000 | 10/90 | 4000 | 3000 |
| 3 | 2 | 2500 | 20/80 | 5000 | 6000 |
| 4 | 2 | 1100 | 10/90 | 900 | 1000 |
| 5 | 2 | 1700 | 30/70 | 2000 | 3000 |
| 6 | 2 | 2600 | 10/90 | 8000 | 7000 |
| 7 | 3 | 6500 | 20/80 | 9000 | 8000 |
| 8 | 3 | 3000 | 6/94 | 4000 | 3500 |
| 9 | 2 | 2000 | 15/85 | 1000 | 2000 |
| 10 | 3 | 3000 | 70/30 | 7000 | 8000 |

(a) Copolymer of 60 percent acrylamide and 40 percent sodium acrylate having a particle size ≦0.25 mm
(b) Copolymer of 40 percent acrylamide and 60 percent diethylammonium ethylacrylate sulfate having a particle size of ≦0.25 mm

Use of the Products

EXAMPLE 11 coal slurry having a solids content of 50 g/l was flocculated with the secondary dispersions in Example 1a–10a. 0.5 g of the solid polymer of series (a) was used per m$^3$ slurry and the sedimentation rate was measured. The results are given in Table II. The dewatering rates for municipal sewage sludge were tested using the polymers in series (b) as shown in Table I. This sludge had a solids content of 40 g/l. The dewatering rate was determined in accordance with the procedures set forth in B. Sander, Chemie-Ingenieur-Technik 51, No. 6, (1979), p. 1. These results are also summarized in Table II.

COMPARISON EXAMPLE 1a

A copolymer of 60 percent acrylamide and 40 percent acrylic acid having a particle size ≦0.25 mm was dispersed in water and 0.5 g/m$^3$ was added to a coal slurry having a solids content of 50 g/l.

COMPARISON EXAMPLE 1b

A copolymer of 40 weight percent acrylamide and 60 percent diethylamino ethylacrylate sulfite having a particle size ≦0.25 mm was dispersed in water and was added at a rate of 200 ppm as a flocculant to municipal sewage sludge having a solids content of 40 g/l in order to determine the rate of dewatering.

COMPARISON EXAMPLE 2a

A secondary water-in-oil dispersion of a copolymer of 60 percent acrylamide and 40 percent sodium acrylate, which had a viscosity of 900 mPas and a polymer content of 50 percent, was added at a rate of 0.5 g/m³ as a flocculant to coal slurry.

COMPARISON EXAMPLE 2b

A secondary water-in-oil dispersion of the polymer was prepared by using a ball mill to wet grind 100 parts of the polyacrylamide of 60 percent diethylammonium ethylacrylate sulfate and 40 percent acrylamide, 65 parts of a hydrocarbon oil, 3 parts sorbitan monooleate, 2 parts of an alkoxylated octylphenol, and 20 parts water using steel balls 20 mm in diameter. After 24 hours on a shaker, a relatively unstable emulsion was obtained.

COMPARISON EXAMPLE 3a

A primary water-in-oil dispersion of a copolymer of series (a) in Table I having a solids content of 25 percent and a viscosity of 500 mPas was used in the sedimentation of coal slurry.

COMPARISON EXAMPLE 3b

A copolymer of series (b) in Table I was used in the form of a primary water-in-oil dispersion for dewatering municipal sewage sludge. The results of the Examples and Comparison Examples are summarized in Table II.

COMPARISON EXAMPLE 4a 66.5 parts water and 20 parts of the polyethylene polyol of Example 1 having a molecular weight of 4000 were mixed together in a 500 ml flask equipped with a stirrer, reflux condenser, and a tube for adding nitrogen. Then 4.5 parts NaOH, 7.5 parts acrylic acid, and 18 parts acrylamide were metered in and dissolved. After flushing thoroughly with nitrogen, one part of a 1 percent aqueous potassium persulfate solution and two parts of a 2 percent aqueous triethanolamine solution were added. The polymerization was performed while stirring the reaction mixture at 40° C. As the polymerization proceeded, a second phase developed in the form of droplets. After four hours the polymerization was ended. The amount of residual acrylamide was determined in accordance with DIN 19 622. It was found to be 0.03 weight percent. The water-in-water emulsion had a viscosity of 25,000 mPas at 20° C.

COMPARISON EXAMPLE 4b

Fifty parts water and 17 parts of the polyether polyol of Example 7 having a molecular weight of 6500 were mixed together in the apparatus described in 4a.

Thereupon, 16 parts diethylammonium ethyacrylate sulfate and 10 parts acrylamide were added. After removing the oxygen by flushing with nitrogen, 3 parts of a 1 percent potassium persulfate solution and 3 parts of a 10 percent triethanolamine solution were added as polymerization initiators. A yield of >99 percent was achieved after six hours at 60° C.

The viscosity of the water-in-water emulsion was 20,000 mPas at 20° C.

TABLE II

| Polymer from Example | Sedimentation of Coal Slurry with 50 g/l Solids Content Through Addition of 0.5 g Polymer/m³ | Polymer of Example | Optimal Dose$^x$ of Polymer (ppm) | Dewatering Rate (ml/min.) Municipal Sewage Sludge |
|---|---|---|---|---|
| 1a | 1.2 | 1b | 200 | 180 |
| 2a | 0.9 | 2b | 250 | 160 |
| 3a | 1.6 | 3b | 150 | 200 |
| 4a | 1.1 | 4b | 200 | 160 |
| 5a | 1.2 | 5b | 250 | 150 |
| 6a | 1.0 | 6b | 200 | 200 |
| 7a | 1.8 | 7b | 250 | 120 |
| 8a | 1.6 | 8b | 200 | 140 |
| 9a | 1.2 | 9b | 150 | 200 |
| 10a | 1.2 | 10b | 150 | 200 |
| Comparison 1a | 1.1 | Comparison 1b | 200 | 150 |
| Comparison 2a | 1.5 | Comparison 2b | 250 | 150 |
| Comparison 3a | 1.5 | Comparison 3b | 200 | 160 |
| Comparison 4a | 0.8 | Comparison 4b | 250 | 100 |

$^x$The optimum dose was determined optically using a series of concentrations. This dose was present when large stable flakes were observed.

The embodiments of the invention in which an exclusive privilege or property is claimed are defined as follows:

1. Process for the preparation of water-in-water secondary dispersions of water-soluble polymers wherein powdered homopolymers or copolymers of (meth)acrylamides, (meth)acrylic acid and (meth)acrylic acid esters of amino alcohols or their salts are dispersed in an aqueous solution containing from about 2 to 50 percent by weight of a polymer of ethylene oxide and/or propylene oxide having a molecular weight of from 500 to 10,000.

2. Process of claim 1 wherein the homopolymers or copolymers of (meth)acrylamides, (meth)acrylic acid and (meth)acrylic acid esters of amino alcohols or their salts, which are present in solid form and have a particle size less than 0.3 mm, are dispersed in an aqueous solution of polyethylene glycol, copolymers of ethylene oxide and propylene oxide or polypropylene glycol.

3. The process of claim 2 wherein said homopolymers or copolymers which are present in solid form have a particle size of from about 0.1 μm to 0.3 mm.

4. The process of claim 2 wherein said homopolymers and copolymers have a molecular weight of at least about 1,000,000.

5. The process of claim 4 wherein said homopolymers and copolymers have a K-value of about 150 to 300 measured in 5 percent aqueous NaCl solution at a temperature of 20° C.

6. The process of claim 2 wherein said aqueous solution also contains an emulsifier which is liquid at room temperature.

7. The process of claim 6 wherein the amount of said emulsifier is about 1 to 5 percent by weight of the total composition.

8. The process of claim 7 wherein said homopolymers or copolymers which are present in solid form have a particle size of from about 0.1 μm to 0.3 mm.

9. The process of claim 7 wherein said homopolymers and copolymers have a molecular weight of at least about 1,000,000.

10. The process of claim 9 wherein said homopolymers and copolymers have a K-value of about 150 to 300 measured in 5 percent aqueous NaCl solution at a temperature of 20° C.

11. The process of claim 10 wherein said emulsifier is selected from the group consisting of water-in-oil emulsifiers having an HLB value of 4 to 6, and oil-in-water emulsifiers having an HLB value of 8 to 18 and combinations thereof.

12. The process of claim 11 wherein said water-in-oil emulsifiers are sorbitan esters of fatty acids and said oil-in-water emulsifiers are oxyalkylene group-containing wetting agents.

13. The process of clarifying coal slurries and waste water and for processing ore comprising adding to such liquid the water-in-water secondary dispersions produced by the process of claim 2.

14. The process of clarifying coal slurries and waste water and for processing ore comprising adding to such liquid the water-in-water secondary dispersions produced by the process of claim 6.

* * * * *